United States Patent
Layton et al.

(10) Patent No.: US 9,947,318 B2
(45) Date of Patent: Apr. 17, 2018

(54) SYSTEM AND METHOD FOR PROCESSING AN AUDIO SIGNAL CAPTURED FROM A MICROPHONE

(71) Applicant: 2236008 Ontario Inc., Waterloo (CA)

(72) Inventors: Leonard Charles Layton, Vancouver (CA); Phillip Alan Hetherington, Port Moody (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 109 days.

(21) Appl. No.: 14/506,048

(22) Filed: Oct. 3, 2014

(65) Prior Publication Data
US 2016/0098989 A1   Apr. 7, 2016

(51) Int. Cl.
*G10L 15/20* (2006.01)
*G10L 21/0208* (2013.01)
*G10L 25/84* (2013.01)

(52) U.S. Cl.
CPC .......... *G10L 15/20* (2013.01); *G10L 21/0208* (2013.01); *G10L 25/84* (2013.01); *G10L 2021/02082* (2013.01)

(58) Field of Classification Search
CPC ..... G10L 15/20; G10L 25/84; G10L 21/0208; G10L 2021/02082
See application file for complete search history.

(56) References Cited

U.S. PATENT DOCUMENTS

| | | | |
|---|---|---|---|
| 6,859,773 B2 * | 2/2005 | Breton | G10L 21/0208 704/226 |
| 8,577,675 B2 * | 11/2013 | Jelinek | G10L 21/0208 379/392.01 |
| 2004/0204933 A1 | 10/2004 | Walker | |
| 2005/0071156 A1 * | 3/2005 | Xu | G10L 21/0208 704/226 |
| 2008/0071547 A1 | 3/2008 | Prieto et al. | |
| 2008/0167866 A1 * | 7/2008 | Hetherington | G10L 21/0208 704/228 |

(Continued)

FOREIGN PATENT DOCUMENTS

EP   2 760 019 A1   7/2014

OTHER PUBLICATIONS

European Search Report for corresponding European Application No. 15188091.1 dated Dec. 8, 2015, 8 pages.
(Continued)

*Primary Examiner* — Walter Yehl
(74) *Attorney, Agent, or Firm* — Brinks Gilson & Lione

(57) ABSTRACT

A system and method for processing an audio signal captured from a microphone may reproduce a known audio signal with an audio transducer into an acoustic space. The known audio signal may include content from one or more audio sources. A microphone audio signal may be captured from the acoustic space where the microphone audio signal comprises the known audio signal and one or more unknown audio signals. Processing control information may be accessed. The known audio signal may be reduced in the microphone audio signal responsive to the processing control information where the processing control information indicates one or more characteristics of a downstream audio processor that processes the microphone audio signal.

26 Claims, 5 Drawing Sheets

(56) References Cited

U.S. PATENT DOCUMENTS

| | | | |
|---|---|---|---|
| 2011/0145000 A1* | 6/2011 | Hoepken | G10L 15/22 704/275 |
| 2011/0246190 A1 | 10/2011 | Suzuki et al. | |
| 2011/0264447 A1* | 10/2011 | Visser | G10L 25/78 704/208 |
| 2012/0232890 A1* | 9/2012 | Suzuki | G10L 25/78 704/226 |
| 2013/0185065 A1* | 7/2013 | Tzirkel-Hancock | G10L 15/20 704/233 |
| 2014/0140555 A1* | 5/2014 | Pilgrim | H04R 25/407 381/317 |
| 2014/0274218 A1 | 9/2014 | Kadiwala et al. | |

OTHER PUBLICATIONS

Communication corresponding to European Application No. 15188091.1 dated May 9, 2017, 7 pages.

\* cited by examiner

SYSTEM AND METHOD FOR PROCESSING AN AUDIO SIGNAL CAPTURED FROM A MICROPHONE

BACKGROUND

1. Technical Field

The present disclosure relates to the field of processing audio signals. In particular, to a system and method for processing an audio signal captured from a microphone.

2. Related Art

Consumer speech recognition systems are commonly utilized to control mobile phones, automobile functions, game machines and personal computers. The first practical consumer speech recognition implementations are commonly initiated using "push to talk" where a user pushes a button to start the speech recognition system. Starting the speech recognition system includes capturing and processing the audio from a microphone. Audio is not captured from the microphone when the speech recognition system is off. Newer speech recognition systems may never be off or inactive as the audio may be captured and processed continuously. In many cases, the newer speech recognition systems listen for a small set of activation keywords in order to initiate the full functionality and recognize more than the small set of activation keywords. The small set of activation keywords operates in a similar fashion to the "push to talk" initiation in order to minimize the occurrences of false positive recognition results.

In order for speech recognition systems to achieve reasonable recognition rates the audio captured from the microphone may be processed to reduce noise and/or echo. For example, a speech recognition system operating on a mobile phone may utilize the mobile phone's built-in echo canceller/noise suppressor to process the audio captured by the microphone. In some configurations, the speech recognition system does not operate on the same device as the microphone. For example, a wireless headset may capture the audio, process the audio and then transmit the audio to a mobile phone that handles the speech recognition. In an alternative example, an automobile headunit may capture and process the audio and send the resulting audio to a mobile phone or a cloud based server for speech recognition. The audio captured from inside an automobile may be problematic to the speech recognition system because there may be many sources of audio to confuse the speech recognition system. An automobile may have many different audio sources including navigation prompts, music, chimes/gongs and text to speech output. Each of these audio sources may be captured in the microphone signal that is sent to the speech recognition system. There is a need for improved processing of audio captured in an automobile or other similar environments for use in voice recognition systems.

BRIEF DESCRIPTION OF DRAWINGS

The system and method may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION

Figure 1:
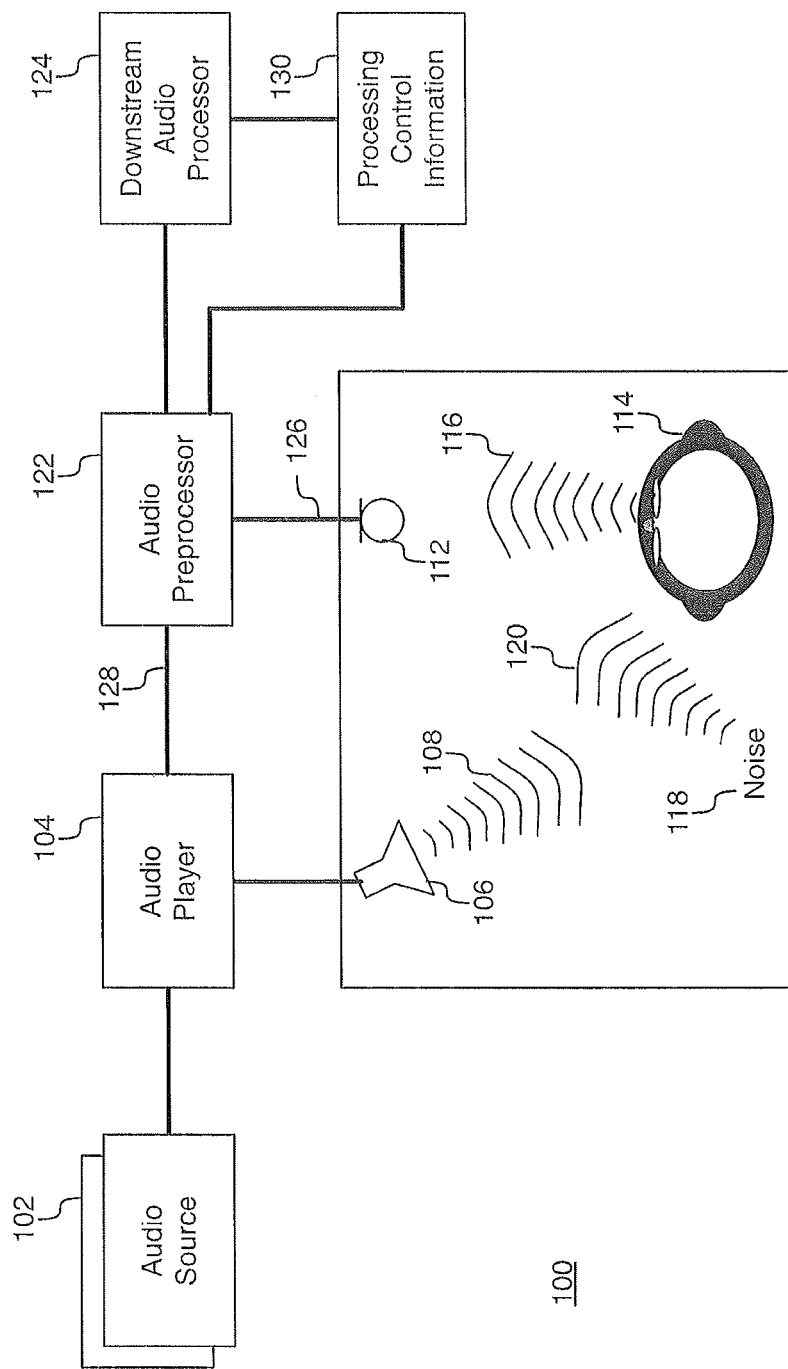
FIG. 1 is a schematic representation of a system for processing an audio signal captured from a microphone.

A system and method for processing an audio signal captured from a microphone may reproduce a known audio signal with an audio transducer into an acoustic space. The known audio signal may include content from one or more audio sources. A microphone audio signal may be captured from the acoustic space where the microphone audio signal comprises the known audio signal and one or more unknown audio signals. Processing control information may be accessed. The known audio signal may be reduced in the microphone audio signal responsive to the processing control information where the processing control information indicates one or more characteristics of a downstream audio processor that processes the microphone audio signal.

An automobile may contain many different audio sources as described above. The audio system within the automobile may have knowledge of these different audio sources. The audio system may also have knowledge that one or more of the microphones may be utilized for speech recognition. In order to improve the results of the speech recognition, the automobile audio system may process the captured audio signal and attempt to remove the audio sources that are not directed towards or intended for the speech recognition system. For example, the automobile audio system may be playing a navigation prompt that may be captured by the microphone and then sent to the speech recognition system. The captured navigation prompt may generate an incorrect/undesirable recognition result. The automobile audio system may utilize the navigation prompt as a reference signal that may be removed or reduced when the captured microphone audio is processed. In another example, a talk radio broadcast may be playing and accidently trigger (e.g. false positive trigger) the activation keywords of an "always on" voice recognition system. It may be desirable to remove one of more of these reference audio sources. In one solution, the mixed output that is sent to the speakers in the automobile may be utilized as reference audio source to be removed in the captured audio signal. An echo/noise canceller may reduce the reference audio sources when applied to the captured audio signal. The processing of the captured audio signal may be configured to produce improved speech recognition results instead of being perceptibly pleasing to a human listener. For example, less noise may be removed from the captured audio signal because the speech recognizer may be more tolerant of noise than a human listener and/or the noise removal processing may negatively impact the recognition rate.

In one alternative, the processing of the captured audio signal may be performed on the device executing the speech recognizer when the automobile system provides one or more reference audio signals to the device. The device executing the speech recognizer may processes the captured audio signal with respect to the reference audio signals. The device may not have as much knowledge of the acoustic environment inside the automobile compared to the automobile audio system and therefore the resulting processed audio signals may be similar but not necessarily identical.

FIG. 1 is a schematic representation of a system for processing an audio signal captured from a microphone 100. One or more audio sources 102 may send audio content to an audio player 104. The one or more audio sources 102 may send audio content including, for example, any one or more of: AM/FM/Digital radio, music, navigation prompts, text-to-speech, hands-free phone conversation, game sounds, ring tones, vehicle alerts, synthesized engine sounds, dynamically-generated audio prompts and vehicle chimes. The audio player 104 may process and combine, or mix, the audio content sent from the one or more audio sources 102. The audio player 104 may process the audio contents using, for example, any one or more of: equalization, dynamic range compression, adaptive gain control, panning gains and volume control. The audio player 104 may mix the audio content and reproduce the mixed audio signal, or known audio signal, with one or more audio transducers 106 into an acoustic space 110. The audio player 104 may create two or more known audio signals (e.g. stereo or multi-channel) reproducible by two or more audio transducers 106. The mixed audio signal may be referred to as a known audio signal or a reference audio signal because the audio player 104 may be the last modification of the audio content before being reproduced into the acoustic space 110.

The acoustic space 110 may be, for example, a room or an automobile interior. The acoustic space 110 may contain one or more acoustic sound sources including, for example, the known audio signal reproduced using the audio transducer 106 referred to as a reproduced known audio signal 108, a noise signal 120 associated with a noise source 118, and voice signals 116 associated with a user 114. The acoustic space 110 may contain one or more known audio signals 108, one or more noise signals 120 and one or more voice signals 116. The noise signal 120 may include, for example, air conditioner noise, road noise, wind noise, background noise, echoes and reverberation. In one alternative, a voice signal 116 may be considered to be a noise signal 120.

A microphone audio signal 126 may be captured from the acoustic space 110 using one or more microphones 112. One or more microphone audio signals 126 may be captured from the acoustic space 110. The microphone audio signal 126 may include a combination of any one or more of the known audio signal 108, the noise signal 120 and the voice signal 116. The known audio signal 108 captured using the microphone 112 may be modified by the acoustic environment 110. The known audio signal 108 components captured by the microphone 112 may contain, for example, echoes, reverberation, and time/frequency modifications associated with the acoustic environment 110.

An audio preprocessor 122 may modify the microphone audio signal 126. The audio preprocessor 122 may utilize, for example, a noise reducer to reduce background noise from the microphone audio signal 126. A downstream audio processor 124 may modify, utilize, or process the microphone audio signal 126 after modification by the audio preprocessor 122. The audio preprocessor 122 may access processing control information 130 where the processing control information 130 indicates one or more characteristics of the downstream audio processor 124. In one example, the downstream audio processor 124 may send the audio preprocessor 122 processing control information 130. In an alternative example, the system 100 may be configured where the audio preprocessor 122 has the processing control information 130 associated with the downstream audio processor 124 before runtime. The audio preprocessor 122 may access one or more sets of processing control information 130 associated with one or more downstream audio processors 124 and modify the microphone audio signal 126 for each of the one or more downstream audio processors 124 responsive to the associated processing control information 130.

The downstream audio processor 124 may include, for example, any one or more of: a perceptual audio processor and a machine audio processor. The perceptual audio processor may include, for example, a hands free phone processor, engine sound synthesizer, active noise canceller and/or in-car communication processor. The perceptual audio processor may apply additional audio processing to the microphone audio signal 126 including, for example, noise suppression and echo cancellation. The perceptual audio processor may modify the microphone audio signal 126 to be perceptible pleasing to a human listener where the modified microphone audio signal may typically be reproduced using an audio transducer. The audio transducer used to reproduce the modified microphone audio signal from the perceptual audio processor may be the audio transducer 106 associated with acoustic environment 110 or an audio transducer associated with, for example, a mobile phone not contained within the acoustic environment 110.

The machine audio processor may include, for example, an automatic speech recognizer, or ASR, where the ASR produces speech recognition results. The machine audio processor may output a modified microphone audio signal that is not reproduced using an audio transducer. The machine audio processor may apply additional audio processing to the microphone audio signal 126 including, for example, noise suppression. The ASR may have multiple processing modes including, for example, as voice recognizer and as keyword recognizer. The voice recognizer may process a large grammar set containing many words. The keyword recognizer may recognize only a few words where the system 100 continuously processes the microphone audio signal 126 with an ASR. The keyword recognizer may function as a trigger allowing a user to verbally trigger the voice recognizer using one or more keywords thereby reducing the likelihood of recognition errors. For example, the keyword recognizer may activate the voice recognizer when the spoken words "activate recognition" are recognized. The keyword recognizer may prevent the voice recognizer from accidentally interpreting speech not intended for the voice recognizer as a control command. For example, spoken words contained in a radio station broadcast being played inside the acoustic environment 110 may not be intended for the voice recognizer.

The processing control information 130 accessed by the audio preprocessor 122 may indicate one or more characteristics of the downstream audio processor 124. The perceptual audio processor may specify the processing control information 130 to indicate that the output of the audio preprocessor be perceptible pleasing to a human listener. For example, the audio preprocessor 122 may apply noise suppression to the microphone audio signal 126 and send the noise-suppressed signal to the perceptual audio processor. The machine audio processor may specify the processing control information 130 to indicate that the output of the audio preprocessor be adapted to improve the results of the machine audio processor. For example, an ASR, executing as the machine audio processor, may be insensitive to noise in the microphone audio signal 126 and specify to the audio preprocessor 122 to apply little or no noise suppression via the processing control information 130. In one alternative, the microphone audio signal 126 may be processed with an acoustic processor. The acoustic processor may, for example, increase or decrease components of the microphone audio signal 126 using speech enhancement and/or equalization techniques. The acoustic processor may execute as a component of the audio preprocessor 122.

The audio preprocessor 122 may receive the known audio signal 128, or reference audio signal, from the audio player 104. The audio preprocessor 122 may utilize the known audio signal 128 to reduce the known audio signal components contained in the microphone audio signal 126. Alternatively or in addition, the perceptual audio processor may reduce the amount of known audio signal in the microphone audio signal 126. The amount of reduction may have a limit for a perceptual audio processor to maintain a perceptibly pleasing output to a human listener. For example, in some embodiments the reduction limit may be limited to a maximum of 10 dB per frequency bin where the reduction is calculated using, for example, a recursive Wiener filter, a Wiener filter or spectral subtraction. The machine audio processor may benefit from reducing the amount of known audio signal in the microphone audio signal 126 more than compared to the perceptual audio processor. The machine audio processor may specify an amount of known audio signal reduction in order for the ASR to mitigate recognition of any words contained within the known audio signal. A significant amount of known audio signal reduction may not be perceptibly pleasing to a human listener.

In some acoustic environments 110, for example an automobile cabin environment, the known audio signal may significantly impair the results of a machine audio processor including ASR. The known audio signal reproduced in the automobile may contain speech content that may not be intended for the speech recognizer (ASR). For example, navigation prompts, vehicle prompts, text to speech output, hands free phone calls, AM/FM/Digital Radio and entertainment music may not be intended for the speech recognizer. The audio preprocessor 122 may improve the ASR results when the known audio signal is reduced in the microphone audio signal 126. In one alternative, one or more known audio signals may not be reduced. For example, the far end speech from a hands-free phone call may be allowed to pass unaltered to the ASR.

The audio preprocessor 122 may be responsive to the processing control information 130 where the microphone audio signal 126 has both noise reduction and known audio signal reduction applied. For example, the perceptual audio processor may have more noise reduction and less known audio signal reduction applied when compared to the machine audio processor. The reduction applied by the audio preprocessor 122 may be, for example, a uniform reduction for each frequency bin, a uniform reduction for each frequency band, non-uniform reduction for each frequency bin, non-uniform reduction for each frequency band, decreasing reduction as frequency increases, or increasing amount of reduction with frequency.

Figure 2:
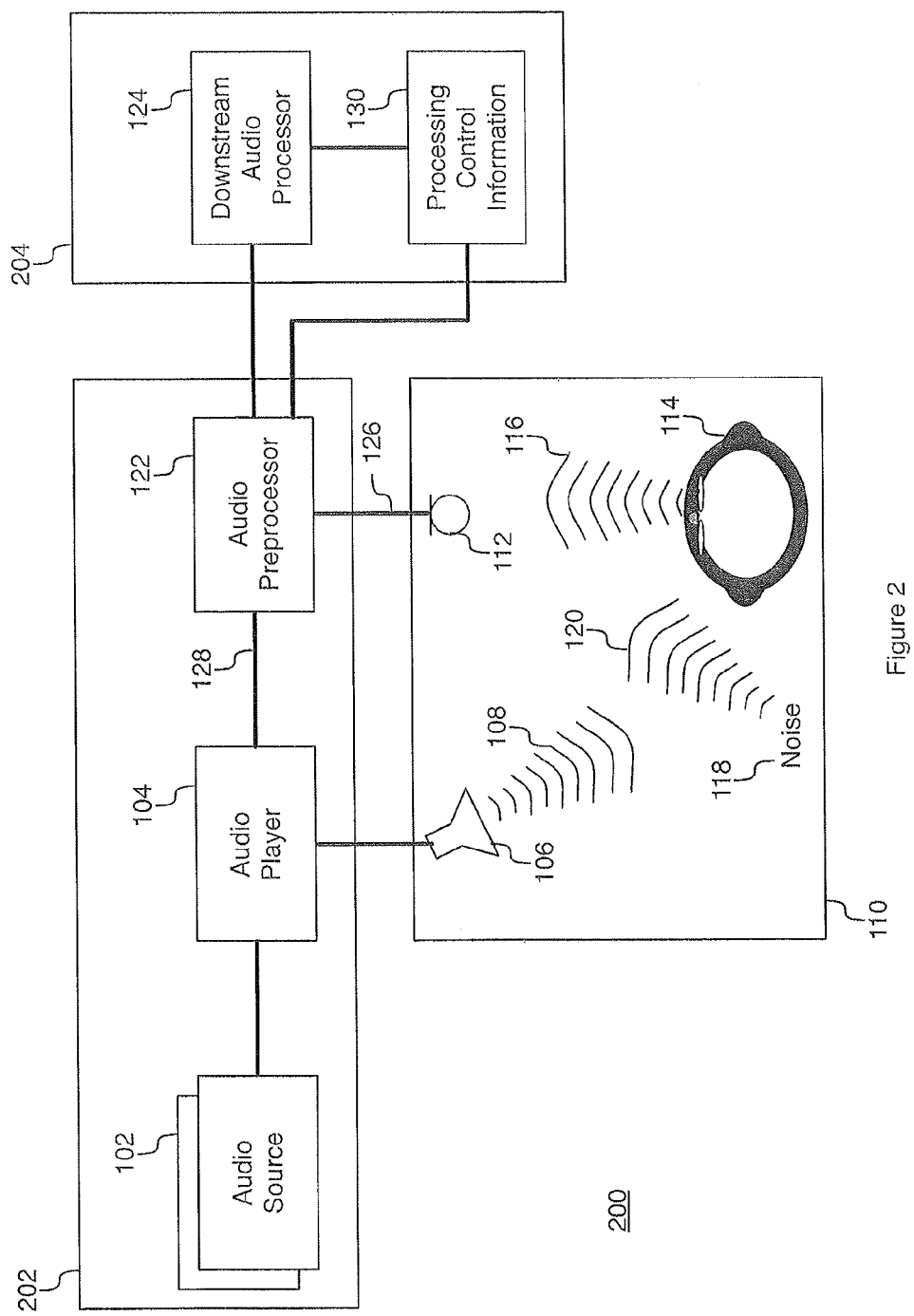
FIG. 2 is a further schematic representation of a system for processing an audio signal captured from a microphone.

FIG. 2 is a further schematic representation of a system for processing an audio signal captured from a microphone 200. A first computing device 202 contains the one or more audio sources 102, the audio player 104, and the audio preprocessor 122 controlling the audio transducer 106 and the microphone 112 as described in FIG. 1. A second computing device 204 contains the downstream audio processor 124 and the processing control information 130 as described in FIG. 1. In one alternative, the processing control information 130 may be contained in the first computing device 202. The first computing device 202 may communicate with the second computing device 204 using wired or wireless networking technology. In one example, the first computing 202 may be an automobile and the second computing device 204 may be a mobile phone. In another example, the first computing device 202 may be a mobile phone and the second computing device 204 may be a server operating in a cloud-based network. The first computing device 202 may send the second computing device 204 a microphone audio signal 126 processed in response to the processing control information 130 associated with the second computing device 204 and/or the contained downstream audio processor 124.

In the above automobile/mobile phone example, the ASR operating on the mobile phone may be continuously processing the microphone audio signal 126 where the audio preprocessor 122 in the automobile may be significantly reducing the known audio signals and applying some noise suppression that may prevent undesirable ASR results. In a further automobile/mobile phone example, the ASR executing on the mobile phone may alternate operation between a keyword recognizer and a voice recognizer where each of the keyword recognizer and the voice recognizer may send different processing control information 130 to the automobile. The audio preprocessor 122 in the automobile may apply different amounts of known signal reduction and noise reduction when the mobile phone switches between the keyword recognizer and the voice recognizer. In a further example the automobile may be operating a downstream audio processor 124 that performs echo cancellation for a hands free phone call at the same time as a mobile phone performs keyword recognition. The audio preprocessor 122 may alternatively output two modified microphone audio signals where one may be modified for the hands free phone call responsive to the echo canceller processing control information 130 and the other responsive to the keyword recognizer processing control information 130.

The keyword recognizer and the voice recognizer may be collocated or operated as separate ASR applications where the keyword recognizer and the voice recognizer may execute in any combination of the first computing device 202 and the second computing device 204. Each of the keyword recognizer and the voice recognizer may execute as part of, for example, the audio preprocessor 122 or the downstream audio processor 124. In one example, the audio preprocessor 122 may execute a speech end pointer that may detect speech utterances in the microphone audio signal 126. The keyword recognizer may execute in the audio preprocessor 122 searching for keywords. When the keyword recognizer successfully recognizes the keywords, subsequently detected speech utterances may be sent to the voice recognizer operating in the downstream audio processor 124. Alternatively, the microphone audio signal 126 may be sent to the downstream audio processor 124 when the keyword recognizer successfully recognizes the keywords. For example, the microphone audio signal 126 may contain the phrase "Hey Navigator, take me home" where the keywords may be "Hey Navigator". Once the keyword recognizer has identified the keywords, the microphone audio signal 126 associated with the phrase "take me home" may be sent to the voice recognizer.

Figure 3:
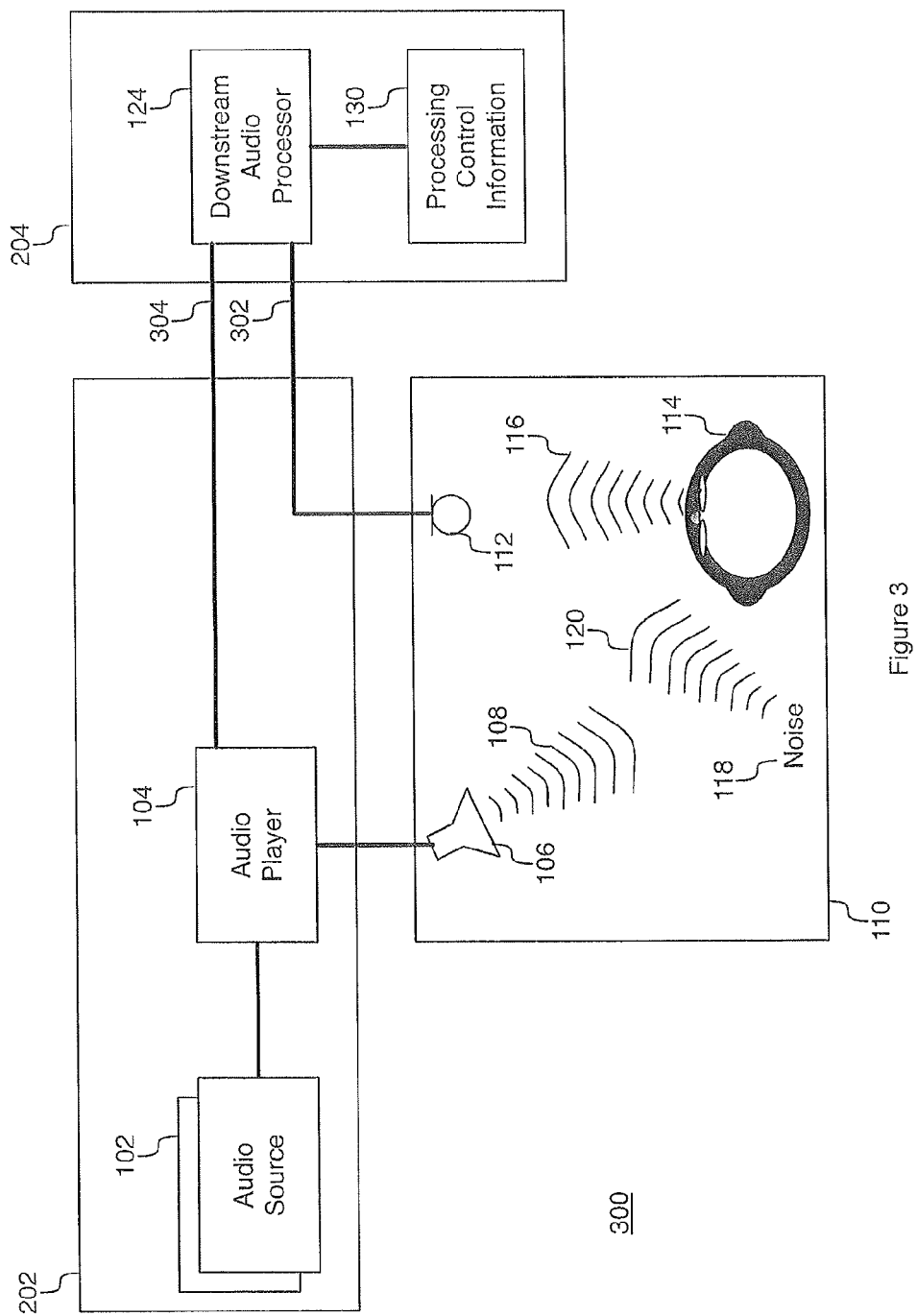
FIG. 3 is another schematic representation of a system for processing an audio signal captured from a microphone.

FIG. 3 is another schematic representation of a system for processing an audio signal captured from a microphone 300. The first computing device 202 transmits the known audio signal 304 and the microphone audio signal 302 to the second computing device 204. The downstream audio processor 124 in the second computing device 204 may reduce the known audio signal 304 contained in the microphone audio signal 302. More audio data may be transmitted between the first computing device 202 and the second computing device 204 in the system 300. One or more known audio signals 304 may be transmitted to the second computing device 204. The processing control information 130 may be combined with, or integrated, with the downstream audio processor 124. The processing control information 130 may be accessed by the first computing device 202 where the processing control information 130 specifies that the known audio signal 304 be transmitted to the second computing device 204.

Figure 4:
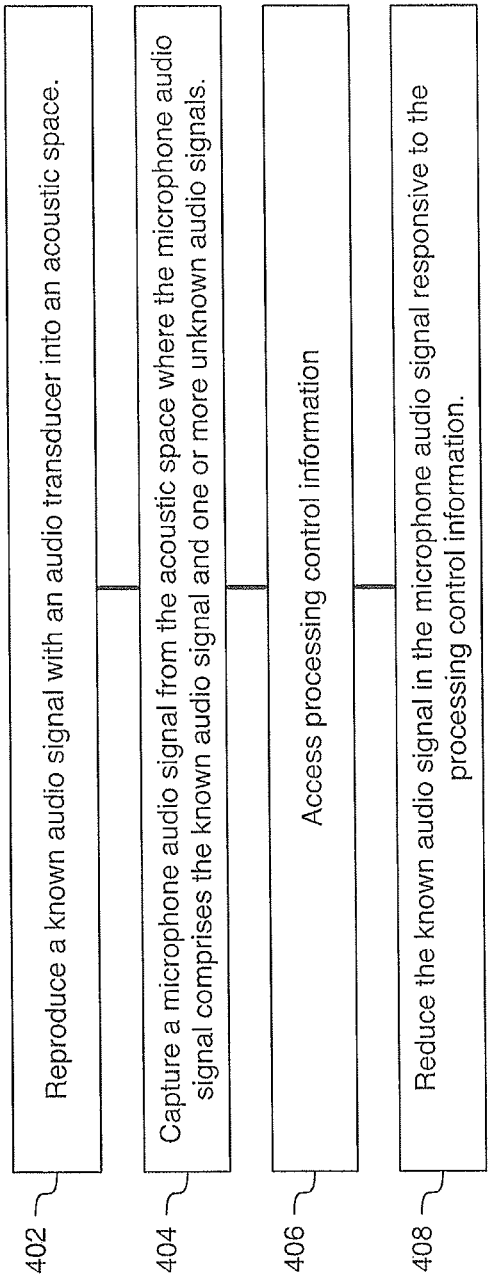
FIG. 4 is a representation of a method for processing an audio signal captured from a microphone.

FIG. 4 is a representation of a method for processing an audio signal captured from a microphone 400. The method 400 may be, for example, implemented using any of the systems 100, 200, 300 and 500 described herein with reference to FIGS. 1, 2, 3 and 5. The method 400 may reproduce a known audio signal with an audio transducer into an acoustic space 402. The known audio signal may include content from one or more audio sources. A microphone audio signal may be captured from the acoustic space where the microphone audio signal comprises the known audio signal and one or more unknown audio signals 404. Processing control information may be accessed 406. The known audio signal may be reduced in the microphone audio signal responsive to the processing control information where the processing control information indicates one or more characteristics of a downstream audio processor that processes the microphone audio signal 408. The downstream audio processor may process the microphone audio signal with, for example, an echo suppressor or utilize the microphone audio signal as input with, for example, an automatic speech recognizer.

Figure 5:
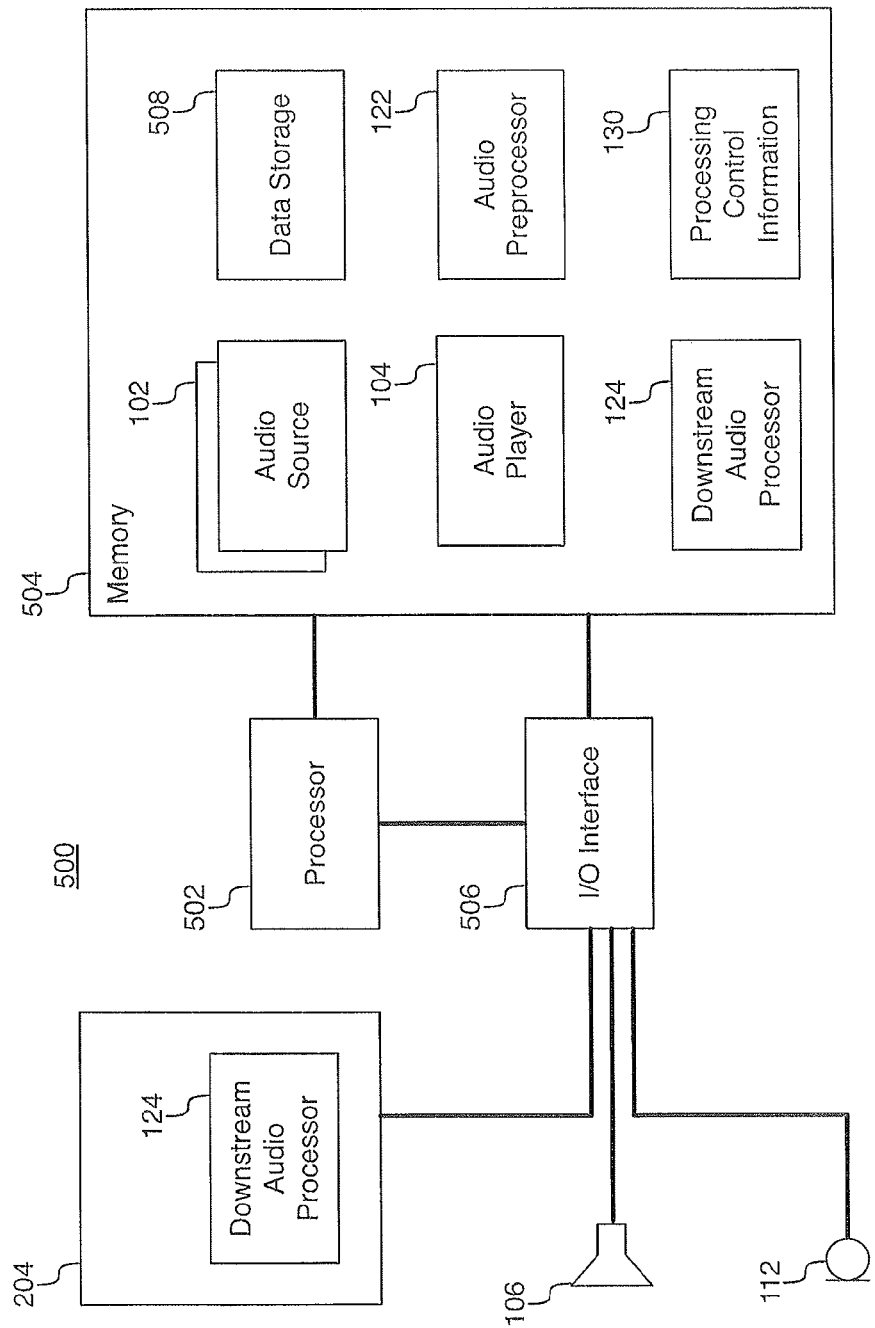
FIG. 5 is a yet further schematic representation of a system for processing an audio signal captured from a microphone.

FIG. 5 is a yet further schematic representation of a system for processing an audio signal captured from a microphone 500. The system 500 comprises a processor 502, memory 504 (the contents of which are accessible by the processor 502) and an I/O interface 506. The memory 504 may store instructions which when executed using the process 502 may cause the system 500 to render the functionality associated with processing an audio signal captured from a microphone as described herein. For example, the memory 504 may store instructions which when executed using the processor 502 may cause the system 500 to render the functionality associated with the one or more audio sources 102, the audio player 104, the audio preprocessor 122, the downstream audio processor 124, and the processing control information 130 as described herein. In addition, data structures, temporary variables and other information may store data in data storage 508.

The processor 502 may comprise a single processor or multiple processors that may be disposed on a single chip, on multiple devices or distributed over more that one system. The processor 502 may be hardware that executes computer executable instructions or computer code embodied in the memory 504 or in other memory to perform one or more features of the system. The processor 502 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 504 may comprise a device for storing and retrieving data, processor executable instructions, or any combination thereof. The memory 504 may include non-volatile and/or volatile memory, such as a random access memory (RAM), a read-only memory (ROM), an erasable programmable read-only memory (EPROM), or a flash memory. The memory 504 may comprise a single device or multiple devices that may be disposed on one or more dedicated memory devices or on a processor or other similar device. Alternatively or in addition, the memory 804 may include an optical, magnetic (hard-drive) or any other form of data storage device.

The memory 504 may store computer code, such as the one or more audio sources 102, the audio player 104, the audio preprocessor 122, the downstream audio processor 124, and the processing control information 130 as described herein. The computer code may include instructions executable with the processor 502. The computer code may be written in any computer language, such as C, C++, assembly language, channel program code, and/or any combination of computer languages. The memory 504 may store information in data structures including, for example, feedback coefficients.

The I/O interface 506 may be used to connect devices such as, for example, the microphone 112, the audio transducers 106, the second computing device 204, the downstream audio processor 124 and to other components of the system 500.

All of the disclosure, regardless of the particular implementation described, is exemplary in nature, rather than limiting. The system 500 may include more, fewer, or different components than illustrated in FIG. 5. Furthermore, each one of the components of system 500 may include more, fewer, or different elements than is illustrated in FIG. 5. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method system and method for processing an audio signal captured from a microphone, it will be apparent to those of ordinary skill in the art that many more embodiments and implementations are possible within the scope of the present invention. Accordingly, the invention is not to be restricted except in light of the attached claims and their equivalents.

The invention claimed is:

1. A method for processing an audio signal captured from a microphone comprising:
   reproducing a reference audio signal with an audio transducer into an acoustic space, the reference audio signal representative of audio not present in the acoustic space prior to reproducing the reference audio signal;
   capturing a microphone audio signal from the acoustic space, the microphone audio signal comprises a known audio signal corresponding to the reference audio signal and one or more unknown audio signals corresponding to noise in the acoustic space;
   receiving processing control information created by a downstream audio processor configured to recognize speech and alternate between a plurality of speech processing modes, the speech processing modes including a keyword recognition mode and voice recognition mode, the processing control information indicative of a current speech processing mode configured on the downstream audio processor;
   determining, in response to receipt of the processing control information, that the current speech processing mode configured on the downstream audio processer changed from at least one of the speech processing modes to the keyword recognition mode or the voice recognition mode;
   identifying, based on the reference audio signal, the known audio signal in the microphone audio signal; and
   adjusting reduction of the known audio signal in the microphone audio signal in response to determination that the downstream audio processer changed from at least one of the speech processing modes to the keyword recognition mode or the voice recognition mode.

2. The method for processing an audio signal captured from a microphone of claim 1, where the downstream audio processor includes anyone or more of: a perceptual audio processor and a machine audio processor.

3. The method for processing an audio signal captured from a microphone of claim 2, where the perceptual audio processor specifies the processing control information to adapt the microphone audio signal to a human listener.

4. The method for processing an audio signal captured from a microphone of claim 2, where the perceptual audio processor includes anyone or more of a hands free phone processor, an active noise canceller, engine sound synthesizer and an in-car communication processor.

5. The method for processing an audio signal captured from a microphone of claim 2, where the machine audio processor specifies the processing control information to adapt the microphone audio signal to improve a result of the machine audio processor.

6. The method for processing an audio signal captured from a microphone of claim 2, where the machine audio processor includes anyone or more of a voice recognizer and a keyword recognizer.

7. The method for processing an audio signal captured from a microphone of claim 1, where reducing the known audio signal in the microphone audio signal uses anyone or more of: Wiener filters and spectral subtraction.

8. A method for processing an audio signal captured from a microphone of claim 1, further comprising processing the microphone audio signal responsive to the processing control information.

9. The method for processing an audio signal captured from a microphone of claim 8, where the processing control information specifies a reduction of the unknown audio signal by anyone or more of: a uniform reduction for each frequency bin, a uniform reduction for each frequency band, non-uniform reduction for each frequency bin, non-uniform reduction for each frequency band, decreasing reduction as frequency increases, and increasing amount of reduction with frequency.

10. The method for processing an audio signal captured from a microphone of claim 1, where the one or more unknown audio signals comprise any one or more of desirable audio signals and undesirable audio signals.

11. The method for processing an audio signal captured from a microphone of claim 10, where the desirable audio signals include speech from one or more users of a voice recognizer.

12. The method for processing an audio signal captured from a microphone of claim 10, where the undesirable audio signals include any one or more of: background noise, road noise, wind noise, music, vehicle alerts, synthesized engine sounds, dynamically-generated audio prompts, text-to-speech and speech.

13. The method for processing an audio signal captured from a microphone of claim 1, where the processing control information specifies a reduction of the known audio signal by anyone or more of: a uniform reduction for each frequency bin, a uniform reduction for each frequency band, non-uniform reduction for each frequency bin, non-uniform reduction for each frequency band, decreasing reduction as frequency increases, and increasing amount of reduction with frequency.

14. A system for processing an audio signal captured from a microphone comprising:
   an audio player reproducing a reference audio signal with an audio transducer into an acoustic space, the reference audio signal representative of audio not present in the acoustic space prior to reproducing the reference audio signal;
   an audio input device capturing a microphone audio signal from the acoustic space;
   a repository containing processing control information associated with a downstream audio processor, the processing control information associated with speech recognition, the processing control information indicating one or more characteristics of a downstream audio processor configured to recognize speech and alternate between a plurality of speech processing modes, the speech processing modes including a keyword recognition mode and voice recognition mode; and
   an audio preprocessor configured to:
      receive processing control information created by the downstream audio processor, the processing control information indicative of at least one of the speech processing modes configured on the downstream audio processor;
      determine, in response to receipt of the processing control information, that the current speech processing mode configured on the downstream audio processer changed from at least one of the speech processing modes to the keyword recognition mode or the voice recognition mode;
      identify a known audio signal and an unknown audio signal, the known audio signal corresponding to the reference audio signal and the unknown audio signal corresponding to noise in the acoustic space, the audio preprocessor; and
      adjust, automatically, before recognition is performed on the microphone audio signal, reduction of the known audio signal in the microphone audio signal in response to determination that the downstream audio processer changed from at least one of the speech processing modes to the keyword recognition mode or the voice recognition mode.

15. The system for processing an audio signal captured from a microphone of claim 14, where the downstream audio processor includes anyone or more of: a perceptual audio processor and a machine audio processor.

16. The system for processing an audio signal captured from a microphone of claim 15, where the perceptual audio processor specifies the processing control information to adapt the microphone audio signal to a human listener.

17. The system for processing an audio signal captured from a microphone of claim 15, where the perceptual audio processor includes anyone or more of a hands free phone processor, an active noise canceller, engine sound synthesizer and an in-car communication processor.

18. The system for processing an audio signal captured from a microphone of claim 15, where the machine audio processor specifies the processing control information to adapt the microphone audio signal to improve a result of the machine audio processor.

19. The system for processing an audio signal captured from a microphone of claim 15, where the machine audio processor includes anyone or more of a voice recognizer and a keyword recognizer.

20. The system for processing an audio signal captured from a microphone of claim 14, where reducing the known audio signal in the microphone audio signal uses anyone or more of: Wiener filters and spectral subtraction.

21. A system for processing an audio signal captured from a microphone of claim 14, further comprising an acoustic processor processing the microphone audio signal responsive to the processing control information.

22. The system for processing an audio signal captured from a microphone of claim 21, where the processing control information specifies the reduction of the unknown audio signal by anyone or more of: a uniform reduction for each frequency bin, a uniform reduction for each frequency band, non-uniform reduction for each frequency bin, non-uniform reduction for each frequency band, decreasing reduction as frequency increases, and increasing amount of reduction with frequency.

23. The system for processing an audio signal captured from a microphone of claim 14, where the one or more unknown audio signals comprise any one or more of desirable audio signals and undesirable audio signals.

24. The system for processing an audio signal captured from a microphone of claim 23, where the desirable audio signals include speech from one or more users of a voice recognizer.

25. The system for processing an audio signal captured from a microphone of claim 23, where the undesirable audio signals include any one or more of: background noise, road noise, wind noise, music, vehicle alerts, synthesized engine sounds, dynamically-generated audio prompts, text-to-speech and speech.

26. The system for processing an audio signal captured from a microphone of claim 14, where the processing control information specifies the reduction of the known audio signal by anyone or more of: a uniform reduction for each frequency bin, a uniform reduction for each frequency band, non-uniform reduction for each frequency bin, non-uniform reduction for each frequency band, decreasing reduction as frequency increases, and increasing amount of reduction with frequency.

* * * * *